United States Patent Office 3,351,356
Patented Nov. 7, 1967

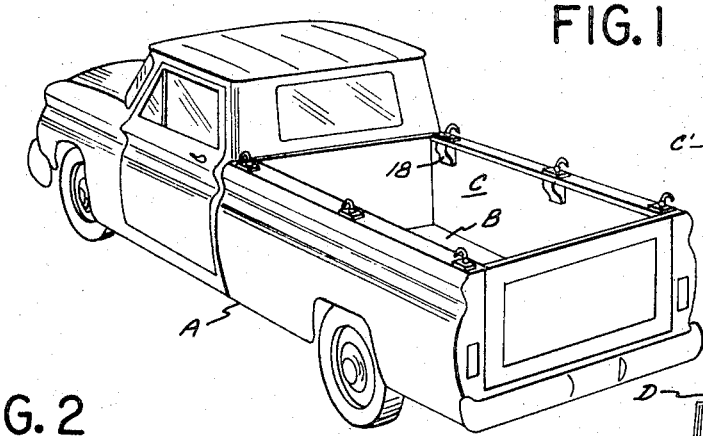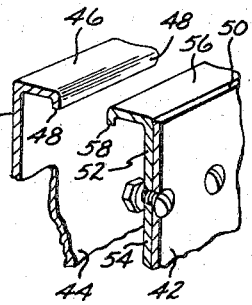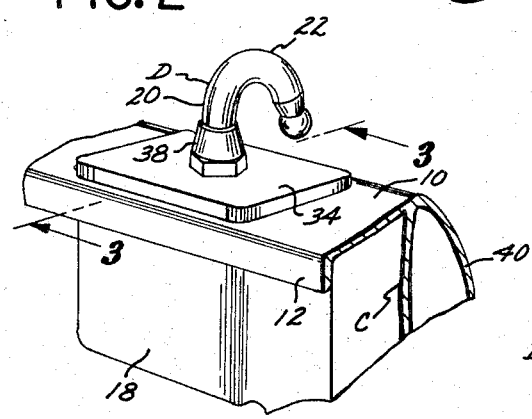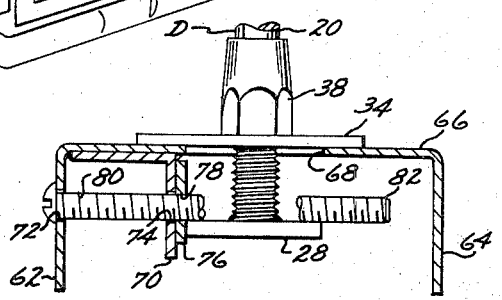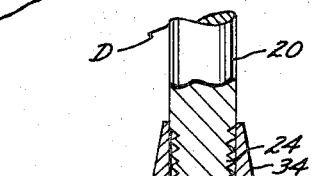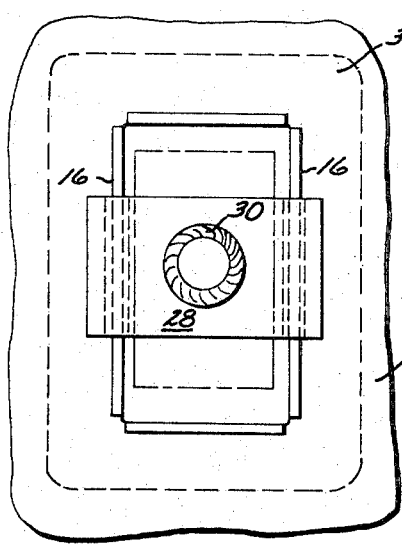

3,351,356
TRUCK TIE-DOWN DEVICE
Bob R. Clark, 6641 Hammond Ave., Long Beach, Calif. 90805, and Glen W. Perry, Long Beach, Calif.; said Perry assignor to said Clark
Filed June 11, 1965, Ser. No. 463,082
6 Claims. (Cl. 280—179)

ABSTRACT OF THE DISCLOSURE

The present invention relates generally to automotive accessories, and more particularly to a tie-down device particularly adapted to be removably mounted on a pick-up truck.

Background of the invention

During the past few years, the pick-up truck has steadily increased in popularity. Such a truck, of course, is provided with a flat bed from which walls extend upwardly, at least along the longitudinal sides thereof. On certain pick-up trucks in current production, cup-shaped receptacles are affixed to the upper interior surfaces of the side walls. The upper ends of these receptacles are covered by longitudinally extending flanges which project inwardly from the upper edges of the walls. Elongate openings are formed in these flanges in longitudinally spaced relationship and are in vertical alignment with the cups. The lower end portions of stakes may be moved downwardly through the openings to engage the receptacles and thereby be removably supported on the vehicle. Such stakes are used in this manner to prevent inadvertent displacement of cargo from the bed of the pick-up truck. Other pick-up trucks on the present day market are provided with side walls which are at least partially defined by two parallel, transversely spaced members between which stakes may be removably supported.

Summary of the invention

A primary object in devising the present invention is to provide a tie-down device adapted to be removably mounted on the side walls of a truck bed, particularly that of a pick-up truck, and when so mounted is susceptible of being engaged by ropes to hold a cargo in a fixed position on the truck bed.

Another object of the invention is to supply an inexpensive truck tie-down device of relatively simple structure that is easily mounted or demounted from the walls of a truck bed.

A further object of the invention is to furnish a truck tie-down device that can be fabricated from standard, commercially available materials, requires no elaborate plant facilities for the production thereof, and can be retailed at a sufficiently low price as to encourage the widespread use thereof.

Brief description of the drawing

FIGURE 1 is a perspective view of a pick-up truck, with the tie-down device removably mounted on the side walls thereof;

FIGURE 2 is an enlarged perspective view of the device;

FIGURE 3 is a combined vertical cross-sectional and side elevational view of the device;

FIGURE 4 is a bottom plan view of the device, taken on the line 4—4 of FIGURE 3;

FIGURE 5 is a perspective view of a mounting assembly for the tie-down that is used on a pick-up truck having a side wall defined by two transversely spaced, parallel rigid members that are at least partially open at the top; and FIGURE 6 is a vertical cross-sectional view of a first alternate form of mounting assembly.

Brief description of the preferred embodiments

With continued reference to the drawing for the general arrangement of the invention, a pick-up truck A is shown in FIGURE 1 that has a flat bed B from which two side walls C extend upwardly along the longitudinal edges thereof. Each side wall C, as best seen in FIGURES 1 through 3, includes a horizontal, inwardly extending flange 10, the inner longitudinal edge of which terminates in a downwardly extending bead 12. A number of longitudinally spaced elongate openings 14 are formed in each flange 10 (FIGURE 3). The longitudinal sides of openings 14 are defined by downwardly extending lips 16. Openings 14 are in vertical alignment with cup-shaped, stake-receiving receptacles 18, as shown in FIGURE 1, which are affixed to the upper interior surfaces of the side walls C. The lower end portions of stakes (not shown) are inserted downwardly through the openings 14 into the receptacles 18, and serve to prevent inadvertent displacement of cargo (not shown) from the bed B.

The detailed structure of one of the tie-down assemblies D is shown in detail in FIGURE 3. Each assembly D includes a rod of steel, or the like, of transverse circular cross section that is bent to define a shank 20 having a hook-like rope-engageable means 22 formed on a first end thereof. It will be apparent that the engageable means 22 could take the form of an eye (not shown) just as well as a hook. The second end of shank 20 is provided with external threads 24, and is threaded into a tapped bore 26 formed in an elongate rigid member 28.

Member 28 is held in a transverse non-rotatable position on the lower end of shank 20 by means of a welded bead 30, or the like. In width, the member 28 is narrower than the opening 14. The length of member 28 is substantially greater than the distance between the two lips 16, as may be seen in FIGURES 3 and 4. Two parallel, longitudinally spaced, transverse recesses 32 are formed in the upper surface of member 28, which may be engaged by the lower surfaces of lips 16.

A generally rectangular rigid plate 34 is provided for each assembly D, and a centrally disposed bore 36 is formed in each plate which slidably engages the shank 20. The length and width of each plate 34 is greater than the length and width of one of the openings 14. Each plate 34, as best shown in FIGURES 1, 2 and 3, is adapted to rest on the upper surface of one of the flanges 10. A number of nuts 38 are provided, each of which engages the threads 24 whereby when the nut is tightened, the lower surface thereof is in bearing contact with the upper surface of the plate 34.

The use and operation of the tie-down assemblies D are most simple. The members 28 are brought into longitudinal alignment with the openings 14 and then moved downwardly therethrough. After each member 28 is disposed below one of the pair of lips 16, the shank 20 affixed to the member is moved to place the recesses 32 in vertical alignment with the lips. Each nut 38 is then rotated in a direction to cause same to move downwardly on that shank 20 on which it is mounted whereby the plate 34 associated therewith is brought into pressure contact with the upper surface of a flange 10.

When one of the plates 34 is in such pressure contact, the lower edges of one pair of lips 16 are in abutting contact with that portion of the members 28 defining the lower part of recesses 32. Tightening of one of the nuts 38 causes one of the pairs of lips 16 and one of the flanges 10 to be pressure-gripped between one of the plates 34 and members 28 to support one of the tie-down assemblies D in a rigid position relative to one of the flanges. When each tie-down assembly D is so mounted, a rope (not shown) can be affixed to the engageable portion 22 of the assembly, with the rope extending to other tie-down assemblies to hold the cargo (not shown) in a fixed position on the flat bed B of the truck A. Removal of one of the tie-down assemblies D from the flange 10 can be accomplished by reversing the above described operation.

In present day pick-up trucks A of the type shown in FIGURES 1 and 3, a second curved wall 40 is disposed outside wall C, which serves not only to decorate the wall but reinforce it as well. However, wall 40 is in no way employed in the operation of the tie-down assembly D. The position of one of the members 28 as it is being inserted through one of the openings 14 is shown in phantom line in FIGURE 4.

In some pick-up trucks in present day production, a side wall C' is defined by two parallel, transversely spaced, upwardly extending panels 42 and 44, as best seen in FIGURE 5. The upper edge of panel 44 develops into a first horizontal web 46 from which a short lip 48 depends. Panel 42 has a straight longitudinally upper edge 50.

A support 52 is provided for each location on the truck where it is desired to mount one of the tie-down assemblies D. Each support 52 includes a wall 54, the upper edge of which develops into a second web 56 having a short second lip 58 projecting from a longitudinal edge thereof. Each wall 54 is secured to panel 42 by bolts or screws 60, as can best be seen in FIGURE 5. The lips 48 and 58 are so transversely spaced as to engage the recesses 32. When nut 38 is tightened, the tie-down assembly D is removably held on the first and second webs 46 and 56 in the same manner as it is held on flange 10 illustrated in FIGURES 2 to 4 inclusive.

A first alternate form of mounting for the tie-down assembly D is shown in FIGURE 6. This alternate form of mounting is used where the walls on the longitudinal sides of the bed B are each defined by two laterally spaced panels 62 and 64 that are connected on their upper ends by a flat, horizontal web 66 having a number of longitudinally spaced elongate openings 68 formed therein. A number of L-shaped clips 70 are supported by conventional means in depending positions from the underside of web 66 adjacent panel 62, as shown in FIGURE 6. The clips 70 are normally a part of the vehicle structure, and are in transverse alignment with the openings 68.

At each of the openings 68, two longitudinally spaced bores 72 are drilled through the panel 62, which is the panel most adjacent the bed B. Two longitudinally spaced bores 74 are also drilled through the clip 70 (FIGURE 6) that are in alignment with bores 72. A strip 76 in which tapped bores 78 are formed that are aligned with the bores 72 and 74, is disposed in abutting contact with the clip 70.

Two long screws 80 are provided, each of which extends through one of the sets of bores 72, 74 and 78. When rotated, each screw 80 draws strip 76 towards clip 70 to removably lock each screw in a non-rotating position relative panel 62, with an elongate portion 82 of each screw extending beyond clip 70. The two elongate screw portions 82 are so spaced longitudinally that the member 28 may be disposed thereunder, and thereafter be brought into pressure contact therewith by tightening the nut 38. When the nut 38 is tightened, the tie-down assembly D is removably held on the web 66, in the same manner as it was held on flange 10 (FIGURE 2).

The use of the tie-down assembly D and the mountings used in conjunction therewith has been described previously in detail and need not be repeated.

We claim:

1. In combination with a truck vehicle having a bed from which side walls extend upwardly to develop into horizontal flanges in which at least one longitudinally extending opening is formed having a pair of lips depending from opposite sides thereof, a tie-down assembly including:
    (a) a shank of circular transverse cross section having external threads formed on a second end portion thereof;
    (b) engageable means on a first end of said shank;
    (c) a rigid elongate member affixed in a transverse position to said second end portion, which member is shorter than the length of said opening but is longer than the width of said opening, with said member having two longitudinally spaced transverse recesses formed in that surface thereof most adjacent said engageable means, which recesses are engageable by said pair of lips when said member is disposed thereunder;
    (d) a plate of greater length and width than said opening, which plate has a bore formed therein that is slidably engaged by said shank; and
    (e) a nut that engages said threads, with said nut when rotated in a first direction contacting said plate to force the same into pressure contact with the surface of said flange opposite that from which said pair of lips project, and with that portion of said member defining said recesses being moved into engagement with said lips to support said assembly in a non-rotatable position from said flange, which nut when rotated in a second direction moves away from said plate to permit said assembly to be separated from said flange.

2. A tie-down assembly as defined in claim 1 wherein said engageable means is of a configuration to permit removable engagement thereof by a flexible elongate member such as a rope or cable.

3. A tie-down assembly as defined in claim 1 wherein said engageable means comprises a hook formed as an integral part of said shank.

4. A tie-down assembly adapted to be removably mounted on a side wall extending upwardly from the bed of a pick-up truck, which side wall is defined by transversely spaced first and second panels, with the upper edge of said first panel developing into a horizontal first web that extends partially across the space between said first and second panels, which first web has a first lip projecting downwardly from the longitudinal edge thereof most adjacent said second panel, said assembly including:
    (a) a support comprising a wall, a second horizontal web, and a second lip projecting downwardly from a longitudinal side edge of said web;
    (b) first means for holding said wall on the interior surface of said second panel, with said first and second webs being disposed in a common horizontal plane, and with said second web being of such dimensions that a space of predetermined width is defined between said first and second webs;
    (c) a shank of circular transverse cross section having an externally threaded portion and first and second ends;
    (d) engageable means on said first end of said shank;
    (e) a rigid member transversely affixed to said second end of said shank, which member is longer than the width of said space and capable of being inserted downwardly therethrough, and in which member two parallel, longitudinally spaced, transversely positioned recesses are formed therein that are engageable by said pair of lips after said member has been moved downwardly through said space;
    (f) a plate of greater width and length than that of said space, which plate has a bore formed therein that slidably engages said shank; and
    (g) a nut that engages said threads on said shank, which nut when rotated in a first direction forces said plate into pressure contact with the upper surface of said first and second webs and said lips into said recesses to removably support said shank in an upwardly extending non-rotatable position on said webs, which nut when rotated in a second direction moves away from said plate to permit said shank, member and plate to be disengaged from said webs.

5. An assembly as defined in claim 4 wherein said first means comprises a plurality of bolts that extend through aligned bores formed in said wall and second panel, and nuts that engage the inner ends of said bolts.

6. An assembly as defined in claim 4 wherein said engageable means is a hook.

References Cited
UNITED STATES PATENTS

| | | | |
|---|---|---|---|
| 1,409,524 | 3/1922 | Chase | 105—369 |
| 1,511,764 | 10/1924 | Jordahl | 287—189.35 |
| 2,545,987 | 11/1948 | Trowbridge | 52—110 |

BENJAMIN HERSH, *Primary Examiner.*

L. D. MORRIS, *Assistant Examiner.*